B. A. SMITH.
TIRE ARMOR.
APPLICATION FILED DEC. 28, 1918.
1,320,283.
Patented Oct. 28, 1919.
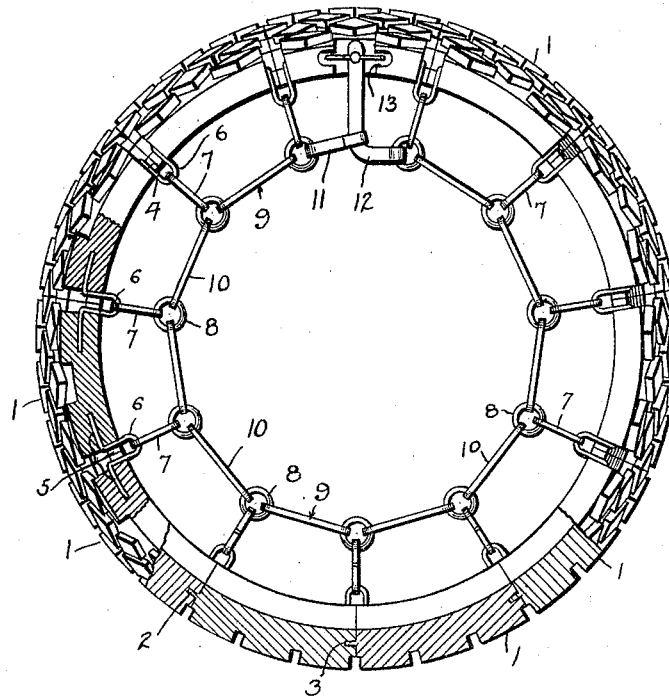
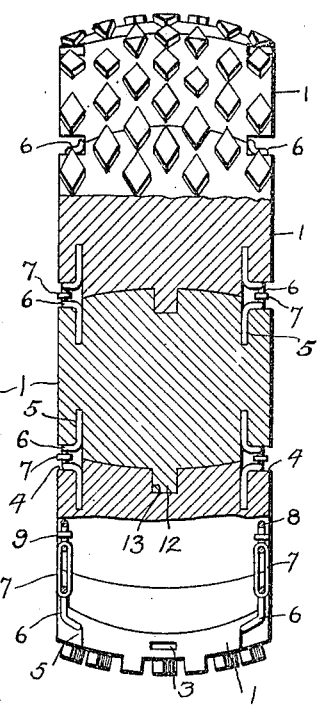
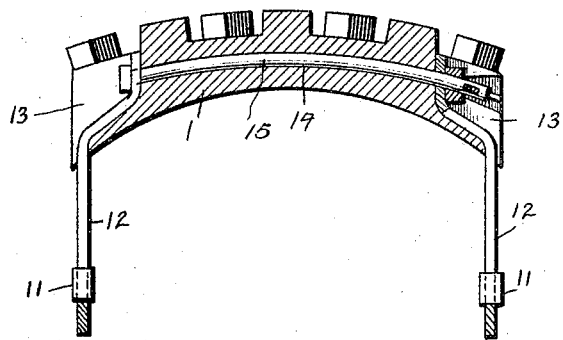
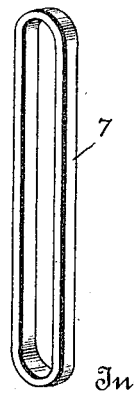
Witnesses
RN Jones
Inventor
B. A. Smith
By Victor J. Evans
Attorney

UNITED STATES PATENT OFFICE.

BENJIMAN A. SMITH, OF SEATTLE, WASHINGTON.

TIRE-ARMOR.

1,320,283. Specification of Letters Patent. Patented Oct. 28, 1919.

Application filed December 28, 1918. Serial No. 268,610.

*To all whom it may concern:*

Be it known that I, BENJIMAN A. SMITH, a citizen of the United States, residing at Seattle, in the county of King and State of Washington, have invented new and useful Improvements in Tire-Armor, of which the following is a specification.

This invention relates to new and useful improvements in an armor for pneumatic tires and the principal object of the invention is to provide a covering for the tread surface of the tire with means for holding the same to the rim.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the invention with parts in section.

Fig. 2 is an edge view, with parts in section.

Fig. 3 is a cross sectional view of the means for securing the tightening levers in position.

Fig. 4 is a detailed view of one of the links for holding the chain to the device.

As shown in these views, the armor is made of a plurality of sections 1, each of which is rounded to fit the tread surface of a pneumatic tire. I prefer to roughen the outer surface of the sections or to provide the same with projections to prevent slipping or skidding of the wheel. Each section is detachably connected with the adjacent sections by means of a central lug 2 engaging a recess 3 in the end of the adjacent section. As will be seen, each section is provided with a lug on one end and a recess on the other. The side edges of each section at the ends thereof are provided with slots 4 and these slots have recesses 5 extending inwardly from the inner corners. These recesses receive the ends of the substantially U-shaped clips 6. The free ends of these clips are bent at right angles and enter said recesses while the rest of the clip is curved outwardly so that the looped end lies below the tread of the sections. Each of these looped ends receives a link 7, which in turn receives a ring 8, forming part of a chain 9, said chain being made up of the rings 8 and the links 10. It will be seen that a pair of these chains are used, one on each side of the device. A hook 11 is secured to one end of each chain and an L-shaped tightening lever 12 is secured to the other end of each chain. When the lever is engaged with the hook and the same pushed upwardly, the chain will be tightened around the rim of the wheel and a strain placed upon the links engaging with the U-shaped clips, and this will tend to bring the different sections together, so as to firmly hold them against the tread surface of the tire. The levers are secured in position by having their ends placed in side slots 13, formed in one of the sections and a bolt passed through eyelets formed on the ends of the levers and through a hole 14 formed in said section. The bolt is held in position by a nut or a cotter pin passing through a hole therein.

When the device is to be removed from the tire it is simply necessary to withdraw the bolt and pull the levers out of the slots. Then by forcing said levers toward the hub of the wheel the chain will be loosened so as to permit the sections to be drawn apart and a few of them removed. This will permit the balance of the device to be removed from the wheel. My invention is more particularly adapted for use on country roads, where there is great danger of cutting the rubber tires by pieces of rock and the like. I prefer to form the sections of metal or other suitable material.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A tire armor comprising a plurality of sections, each section having angle-shaped recesses in its ends located adjacent its sides and a centrally-located recess in one end, a lug on the other end adapted to engage with the central recess on the adjacent section, U-shaped clips having their ends bent and engaging the angle-shaped recesses, a pair of annular chains, links connecting said chains with the clips and means for bringing the ends of the chains together.

2. A tire armor comprising a plurality of sections, each section having angle-shaped recesses in its ends located adjacent its sides and a centrally-located recess in one end, a lug on the other end adapted to engage with the central recesses on the adjacent section, U-shaped clips having their ends bent and engaging the angle-shaped recesses, a pair of annular chains, links connecting said chains with the clips means for bringing the ends of the chains together, said means consisting of an L-shaped lever having one end connected with one end of the chain, a link connected with the other end and slidably engaging said lever and a bolt extending through oue section and securing the free ends of said levers together.

In testimony whereof I have affixed my signature.

BENJIMAN A. SMITH.